June 18, 1968  RYOHEI ODA ET AL  3,389,007
RECORD TRANSFER SHEET MATERIAL, METHOD OF
MAKING AND COMPOSITION
Filed July 17, 1963
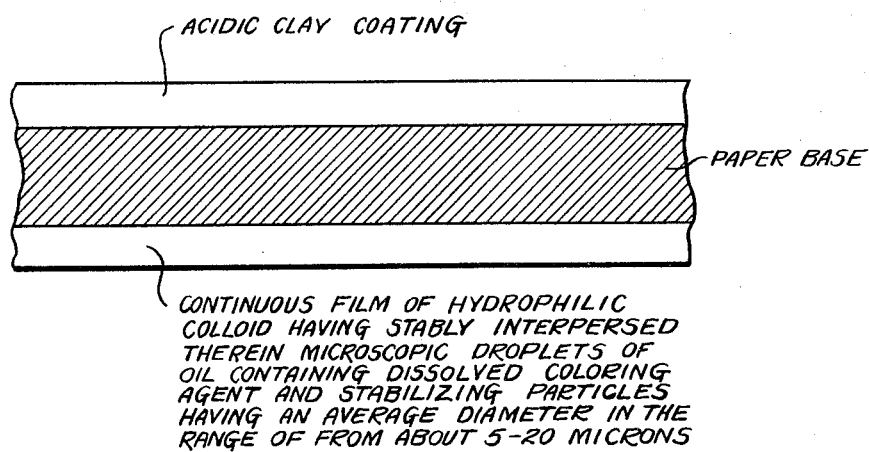
INVENTORS
RYOHEI ODA
HIROSHI FUJII
HIROYUKI MORIGA
BY    SATOSHI DOTANI
ATTORNEY United States Patent Office 3,389,007
Patented June 18, 1968

3,389,007
RECORD TRANSFER SHEET MATERIAL, METHOD OF MAKING AND COMPOSITION
Ryohei Oda, 18 Shichiku, Ushiwaku-cho, Kita-ku, Kyoto, Japan; Hiroshi Tujii, 3 Jokoji, Motomachi 2, Amagasaki, Japan; Hiroyuki Moriga, 111 Higashi, Naruo-cho, Nishinomiya, Japan; and Satoshi Dotani, 270 Muronuchi, Sumiyoshi-cho, Higashinada-ku, Kobe, Japan
Filed July 17, 1963, Ser. No. 295,821
Claims priority, application Japan, July 20, 1962, 37/30,897
12 Claims. (Cl. 117—36.2)

The present invention relates to record material transfer sheets, useful in duplicating and manifolding operations, and more particularly relates to such sheets in which the transfer coating is structured to prevent smudging during ordinary handling of the paper but which in no way interferes with the desired transfer characteristics. The invention includes the production of such smudge-resistant sheets.

Record transfer sheets of the broad type under consideration are known, these being operative by the release of a coloring agent by the application of pressure, the coloring agent being transferred to another surface where it is absorbed and usually undergoes a color reaction to produce a visible mark on the other surface.

In one system for producing such record transfer sheets, an oily marking substance is deposited upon a surface of the sheet in the form of oil droplets dispersed in a hydrophilic colloid which is ruptured by pressure to release the oil droplets. In a typical situation, crystal violet-lactone or malachite green-lactone is dissolved in a non-polar solvent, for example, olive oil and chlorinated biphenyl, and then such solution is emulsified into an aqueous sol of hydrophilic film-forming material, such as casein, gelatin, gum-arabic, etc., and the emulsion is coated onto the back side of a sheet of paper. The emulsion is an oil in water emulsion, the outer, external or continuous phase of the emulsion being the aqueous colloidal sol, and the internal or dispersed phase being the oily solution of dye or dye-forming agent. When the emulsion is deposited upon a sheet of paper to produce a continuous film thereupon, it is important that the dispersed droplets of oily material remain stably dispersed in the film which is formed and not be absorbed into the paper by capillary action. Normally, the opposite surface of the paper is coated with a material which will react with the oily material to produce a color so that, if the oily material is absorbed through the paper, it will come into contact with the opposite surface of the paper to form a color, thus substantially destroying the utility of the paper. Similarly, if the droplets of oil come to the surface of the film which is formed instead of remaining within the coating, then, when several of the record sheets are piled upon one another, the oil droplets on the surface transfer by application of minor pressure, causing smudging and consequent loss in utility.

Accordingly, the present invention has as its object the production of aqueous emulsions of the type under consideration in which the oil droplets remain in stable suspension when the coating is deposited upon a substrate forming the record sheet so that the oil droplets are stably retained within the film which is formed in a manner minimizing any tendency of these droplets to come to the surface of the coating or to be absorbed through the substrate. In this manner, short-circuiting of the color reaction is avoided and smudging is minimized.

In accordance with the present invention, a finely divided substantially water insoluble powder is included in the emulsion and deposited therewith. The finely divided particles may be constituted by a substantially water insoluble inorganic salt having an average particle diameter of from about 5 to about 20 microns, or by a substantially water insoluble metal salt of a fatty acid, having the average particle diameter of the same size referred to for the inorganic salt.

As a further feature of the invention, the additional inclusion of substantially water insoluble organic particles is also beneficial, these optional organic particles permissibly having an average particle diameter of from about 5 to about 50 microns.

Typical substantially water insoluble inorganic salts are zinc hydroxide, zinc oxide, barium carbonate, calcium carbonate, barium sulfate, titanium dioxide, etc.

Substantially water insoluble metal fatty acid salts are illustrated by calcium stearate, magnesium stearate, zinc stearate, lead stearate, calcium oleate, magnesium oleate, etc. Preferably, and with respect to the fatty acid salts, these are first purified using acetone.

Substantially water insoluble organic compounds which may be employed are polymers such as polystyrene, polyvinyl chloride and other water insoluble polymers which are inert with respect to the color forming substance selected. Still other organic substances which may be used are illustrated by alkaline earth metal salts of aliginic acid, cellulose, cellulose acetate, and the like.

In producing the emulsion, the oily material is first emulsified in the aqueous colloidal sol and the finely divided salt particles having the range of size referred to hereinbefore are then dispersed into the emulsion for simultaneous deposition with the oil droplets on the substrate which is coated to form the record transfer sheet.

While numerous dye materials are known for use in record sheets, such as those under consideration, we prefer to employ 3,3-bis-(p-dimethylaminophenyl)-5-aminophthalide, and 3,3 - bis(-p-dimethylaminophenyl)-5-dimethylamino-phthalide. Despite this preference, any of the conventional coloring agents known to the art may be used either alone or in admixture with one another or with those indicated to be preferred herein. Also, and as is well known, the marks are rendered more durable by the inclusion in the oily material of benzoyl leuco methylene blue.

The coloring agent is an oil soluble material and it may be dissolved in numerous essentially non-polar and non-volatile oils which are illustrated by castor oil, liquid paraffin, chlorinated paraffin, O - dichlorobenzene, 2-chloronaphthaline, chlorinated biphenyl, etc., which can be used alone or in admixture.

The emulsion may include a film-forming material. Gelatin having its isoelectric point at pH 4.5, casein, cationic starch, starch, etc., are useful as the film-forming material. It is preferred to use such film-forming materials together. When gelatin is used, it is preferred to use gelatin which has been swelled with water. When casein is used, it is preferred to dissolve it in liquid ammonia (28%) or aqueous sodium hydroxide before use.

The invention is illustrated in the accompanying drawing in which a paper base is coated on one surface thereof with a continuous film of hydrophilic colloid having stably interspersed therein microscopic droplets of oil containing dissolved coloring agent and particles of substantially water-insoluble salt or substantially water insoluble fatty acid salt having an average diameter in the range of from about 5 microns to about 20 microns and serving to stabilize said oil droplets. The other surface of the paper base is coated with an absorbent material reactive with the coloring agent to form a color therewith, usually an acidic clay.

It should be understood that sensitization of the opposite side of the record sheet, while preferred, is not absolutely essential to the invention. Preferred sensitizing agents are acidic clays such as attapulgite or bentonite as well as zeolite materials such as sodium aluminum silicate. Acidic clays treated with sulfuric acid to render them more reactive are preferred.

The invention is specifically illustrated in the following examples.

Example 1

2 parts of 3,3-bis-(p-dimethylaminophenyl)-5-dimethylamino phthalide and 1 part of benzoyl leuco methylene blue are dissolved in 100 parts of an equi-weight mixture of chlorinated biphenyl and castor oil. This oil solution is added with agitation to 250 parts of an aqueous sol containing 10% by weight of an equi-weight mixture of gelatin having an isoelectric point of pH 4.5 and casein and the mixture is dispersed strongly at 80° C. with the addition of 20 parts of titanium dioxide, 20 parts of barium sulfate and 10 parts of finely powdered cellulose. The titanium dioxide and barium sulfate are selected to have an average particle diameter of approximately 10 microns. Said emulsion is diluted to about 20%, and 8 parts of formaldehyde solution (37%) is added to the emulsion and stirred for 3 hours at a temperature of 60° to 80° C. without any pH adjustment. In the solution, film-forming materials form a stable film which includes particles of water insoluble inorganic salts and of water insoluble organic substances.

The resulting emulsion is coated on one surface of an opaque paper sheet and dried. The opposite surface of the paper sheet is sized with attapulgite clay. The record sheet material produced in this manner does not become discolored or stained due to the effect of light, atmospheric conditions, or aging, and is resistant to smudging. Typewriting through several superposed sheets produces a clear, blue-violet mark on the underlying sheets, the record sheets being disposed in normal fashion with the clay layer uppermost and in contact with the undercoating of the overlying sheet which releases the droplets of oily coloring agent upon pressure-disruption of the film containing the same.

Example 2

Example 1 is repeated using the 5-amino derivative instead of the 5-dimethylamino derivative and using, as the oil, 100 parts of an equi-weight mixture of 2-chloronaphthalene and paraffin oil. 30 parts of aluminum stearate finely divided to a particle diameter of about 10 microns is used to provide the water insoluble particles required, the aluminum stearate being added in a dispersion containing the said 30 parts of stearate dispersed in 10 parts of acetone and 30 parts of water. Substantially the same results are obtained.

Example 3

Example 2 is repeated, this time using 3 parts of the amino phthalide instead of 2 parts and using as the nonpolar solvent, an equi-weight mixture of chlorinated biphenyl and chlorinated paraffin oil. The coloring agent-containing oil is added to 250 parts of a water sol containing 10% by weight of an equi-weight mixture of gelatin having an isoelectric point of pH 4.5 and cationic starch. Dispersion is effected with vigorous agitation at 80° C. in the presence of 40 parts of an equi-weight mixture of zinc oxide and aluminum hydroxide, selected to have an average particle diameter of about 10 microns. Excellent results are again obtained.

Example 4

Example 1 is repeated using 1.5 parts of 3,3-bis-(4-dimethylaminophenyl)-5-dimethylamino phthalide; 1 part of 3,3 - bis-(4-dimethylaminophenyl)-5-amino phthalide and 1 part of benzoyl leuco methylene. These dyes are dissolved in 100 parts of an equi-weight mixture of O-chlorobenzene and chlorinated paraffin oil. The dye solution is added to 300 parts of a water sol containing 10% by weight of an equi-weight mixture of cationic starch, gelatin having an isoelectric point of pH 4.5 and casein. The mixture is dispersed strongly at 80° C. with the addition of 10 parts of calcium carbonate, 10 parts of aluminum hydroxide and 10 parts of finely powdered water insoluble polystyrene. The calcium carbonate and aluminum hydroxide are selected to have an average particle diameter of about 10 microns and the polystyrene is selected to have an average particle diameter of about 30 microns.

Approximately the same results reported in Example 1 are obtained by the present example.

The invention is defined in the claims which follow.

We claim:

1. Record transfer sheet material comprising a planar substrate having a continuous film of pressure-disruptable hydrophilic film-forming material coated upon a surface thereof, said film having dispersed therein microscopic oil droplets containing dissolved coloring agent, said oil droplets being stably distributed within said film in the presence in said film of substantially water-insoluble particles having an average diameter in the range of from about 5 microns to about 20 microns, inert to said coloring agent and selected from the group consisting of substantially water-insoluble inorganic salt particles substantially water-insoluble inorganic oxide particles and substantially water-insoluble metal fatty acid salt particles.

2. Record transfer sheet material as recited in claim 1 in which said hydrophilic film-forming material is formaldehyde treated.

3. Record transfer sheet material as recited in claim 1 in which said film further includes substantially water-insoluble organic particles having an average diameter in the range of from about 5 microns to about 50 microns.

4. Record transfer sheet material as recited in claim 3 in which said organic particles are constituted by finely powdered cellulose.

5. Record transfer sheet material as recited in claim 1 in which said water-insoluble particles are particles selected from the group consisting of zinc hydroxide, zinc oxide, barium carbonate, calcium carbonate, barium sulfate, titanium dioxide, calcium stearate, magnesium stearate, zinc stearate and mixtures thereof.

6. Record transfer sheet material as recited in claim 1 in which said film-forming material is selected from the group consisting of casein, gelatin having an isoelectric point of pH 4.5, starch, cationic starch, and mixtures thereof.

7. Record transfer sheet material as recited in claim 1 in which said oil droplets comprise substantially nonvolatile and substantially non-polar oil.

8. Record transfer sheet material as recited in claim 1 in which said substrate is paper and the opposite side of said paper is coated with an acidic clay.

9. Record transfer sheet material as recited in claim 1 in which said coloring agent comprises a 5-amino derivative of 3,3-bis-(p-dimethylaminophenyl)-phthalide.

10. Record transfer sheet material as recited in claim 1 in which said water insoluble particles are present in a weight ratio of from 20 to 40 parts of said particles to 100 parts of said oil droplets.

11. In the production of record transfer sheet material, the improvement comprising adding a solution of coloring agent in substantially non-polar oil to an aqueous sol of hydrophilic colloidal film-forming material to provide an emulsion, adding to said emulsion substantially water insoluble particles having an average diameter in the range of from about 5 microns to about 20 microns, inert to said coloring agent and selected from the group consisting of substantially water-insoluble inorganic salt particles substantially water-insoluble inorganic oxide particles and substantially water-insoluble metal fatty acid salt particles, further emulsifying the mixture so-produced and coating said emulsion upon at least one surface of a planar substrate.

12. An emulsion useful for the production of record transfer sheet material comprising an aqueous sol of hydrophilic colloidal film-forming material having dispersed therein microscopic oil droplets containing dissolved coloring agent and water insoluble particles having an average diameter in the range of from about 5 microns to about 20 microns, inert to said coloring agent and selected from the group consisting of substantially water-insoluble inorganic particles substantially water-insoluble inorganic oxide particles and substantially water-insoluble metal fatty acid particles.

References Cited

UNITED STATES PATENTS

| | | | |
|---|---|---|---|
| 2,348,128 | 5/1944 | Groak | 117—36.2 |
| 2,550,469 | 4/1951 | Green et al. | 117—36.2 |
| 2,655,453 | 10/1953 | Sandberg | 117—36.1 |
| 2,711,375 | 6/1955 | Sandberg | 117—36.2 |
| 2,800,077 | 7/1957 | Marron | 117—36.1 |
| 2,885,302 | 5/1959 | Phillpotts | 117—36.2 |
| 3,016,308 | 1/1962 | Macaulay | 117—36.1 |

MURRAY KATZ, *Primary Examiner.*

WILLIAM D. MARTIN, *Examiner.*